May 23, 1950 K. W. HORNER 2,509,062
SELECTABLE BAND WIDTH COUPLING NETWORK
Filed Sept. 7, 1946

INVENTOR
KENNETH WILLIAM HORNER
BY H. S. Grover
ATTORNEY

Patented May 23, 1950

2,509,062

UNITED STATES PATENT OFFICE 2,509,062

SELECTABLE BAND WIDTH COUPLING NETWORK

Kenneth William Horner, London, England, assignor to Electric & Musical Industries Limited, Hayes, England, a company of Great Britain Application September 7, 1946, Serial No. 695,570
In Great Britain September 7, 1945

9 Claims. (Cl. 178—44)

This invention relates to tuned electrical coupling circuits, and has for its object the provision of an improved circuit of this kind having a wide pass-band.

According to the invention, a tuned electrical coupling circuit comprises first and second transformers having tuned primaries and secondaries and coupled in cascade by a reactive coupling, and means for capacitatively coupling the primary of the first transformer with the secondary of the second transformer so as to widen the pass-band of the circuit.

In one circuit in accordance with the invention the said reactive cascade coupling is constituted by an inductive coupling and in this case it is found that the response curve of the circuit has a substantially flat top with a small peak at resonance. If a tuning indicator is employed in association with the circuit the said peak will operate the indicator so that the operator can ensure that the circuit is tuned to the mid-point of the band.

In another circuit in accordance with the invention the said reactive cascade coupling is a capacitative coupling and in this case it is found that the response curve is again substantially flat-topped but has a small dip at resonance which is likewise useful, when a tuning indicator is employed, for ensuring that the circuit is tuned to the mid-point of the band.

If desired the said peak or dip in the resonance curve can be reduced or eliminated by the insertion of a resistance in series in the coupling connection between the primary of said first transformer and the secondary of said second transformer.

In a preferred embodiment of the invention the said reactive cascade coupling is an inductance or capacitance shunted across the signal circuit path between the secondary of the first transformer and the primary of the second transformer, and said band-pass-widening capacitative coupling is a capacitance arranged to shunt across a signal circuit path between the primary of the first transformer and the secondary of the second transformer.

Preferably a switch is provided whereby the said capacitative coupling between the primary of the first transformer and the secondary of the second transformer can be effectively removed so as to enable the selectivity of the circuit to be changed upon operation of the switch.

In order that the invention may be clearly understood and readily carried into effect, it will now be described with reference to the accompanying drawing, in which.

Figure 1:
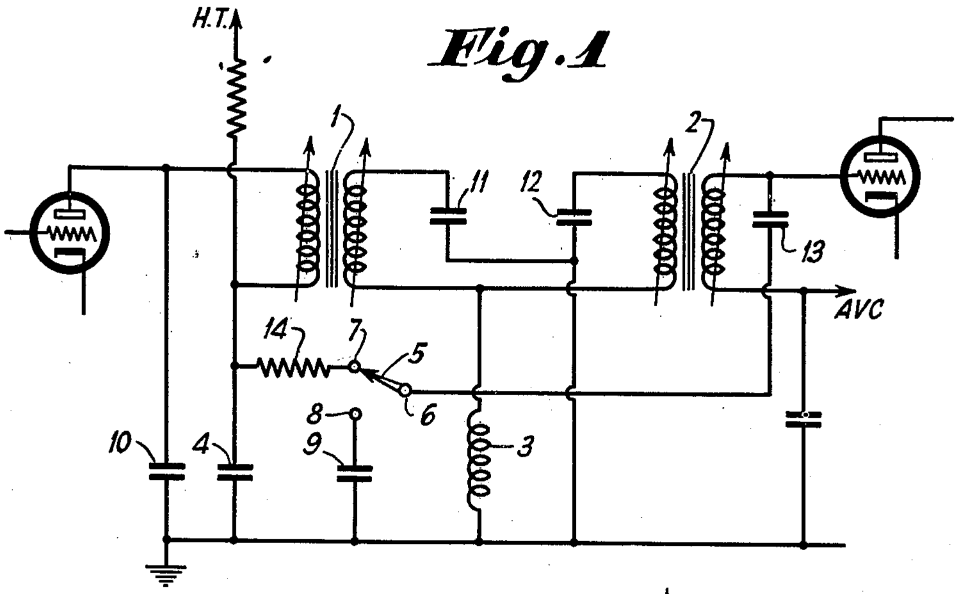
Fig. 1 shows one embodiment of the invention as applied to an intermediate frequency stage of a superheterodyne radio receiver.

Referring to Fig. 1 of the drawing, the circuit shown comprises a first tuned transformer 1 and a second tuned transformer 2. The primary of transformer 1 is coupled to the output of the preceding stage, and the secondary of transformer 2 is coupled to the input of the succeeding stage. The secondary of transformer 1 is inductively coupled to the primary of transformer 2 by means of a shunt inductance 3 which can be considered common to the circuits of both these windings, and the primary of transformer 1 is capacitatively coupled to the secondary of transformer 2 by means of a similar common shunt capacitor 4.

The primary of transformer 1 is connected to the secondary of transformer 2 by way of a switch 5 which can be operated to connect terminal 6 either with terminal 7 as shown or with terminal 8 leading to one terminal of a condenser 9 the other terminal of which is grounded.

With switch 5 in the position shown, the response curve of the circuit is substantially flat-topped with a small peak at resonance. If the inductance 3 is replaced by a capacitance, the response curve is still substantially flat-topped but has a small dip at resonance. By the insertion of a suitable resistance in the connection between the primary of transformer 1 and the secondary of transformer 2 the said peak or dip as the case may be can be reduced or removed. The resistance may, for example, be included at 14.

Figures 2, 3:
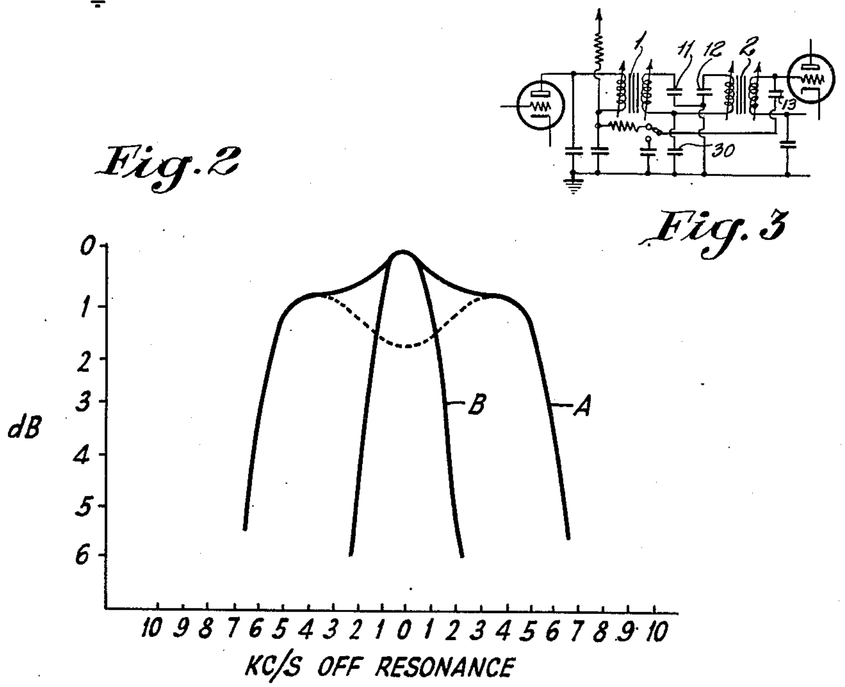
Fig. 2 shows response curves obtained when using specific circuits according to the invention.
Fig. 3 is a modification of the circuit of Fig. 1 in accordance with the invention.

Fig. 3 shows the circuit of Fig. 1 with coupling inductance 3 replaced by a coupling capacitance 30. The circuit is otherwise identical.

If the switch 5 is operated so as to connect terminals 6 and 8 together, the pass-band of the circuit is reduced, and operation of the switch 5 therefore changes the selectivity of the circuit. The condenser 9 is provided in order that the tuning of transformer 2 may be substantially unaffected when the switch 5 is operated from one position to the other.

In a particular case of the circuit shown in Fig. 1, in which the circuit was employed as the first stage of a two-stage I. F. amplifier having a conventional I. F. transformer in the second stage, the inductances of the primaries and secondaries of the transformers 1 and 2 were each about .65 mh. The tuning condensers 10, 11, 12, 13 each had a capacity of 200 $\mu\mu$f., and condensers 4 and 9 each had a capacity of .01 $\mu$f. Inductance 3 was about 7 $\mu$h.

Fig. 2 shows the overall response curves obtained for the above-mentioned particular case. Curve A was obtained with switch 5 in the wide band position, and as will be seen the curve has a substantially flat top over a frequency range of about 8 kc., except for a peak at resonance. With a capacity of about 0.15 $\mu$f. in place of inductance 3, a response curve was obtained which was very similar to curve A but instead of the peak at resonance frequency there was a dip which is shown by the dotted line in the figure. It was found that the peak or dip was practically eliminated if a resistance of 22 ohms was inserted in the circuit at 14.

With the switch 5 operated so as to connect terminals 6 and 8, curve B was obtained, and as can be seen the selectivity is considerably greater in this case than in the cases represented by curve A.

What I claim is:

1. In a variable band-pass coupling network for transferring a selectable band width of high frequency electric signals from an input circuit to an output circuit: a first transformer having a primary winding for connection to said input circuit, and a secondary winding; a second transformer having a secondary winding for connection to said output circuit, and a primary winding; the secondary winding of said first transformer being coupled to the primary winding of said second transformer by means of a pair of connections and a first coupling reactance shunted across said connection to provide an overall narrow band width coupling between the input circuit and the output circuit; a second coupling reactance connected in series with the primary of said first transformer; and selector elements connected for selectably connecting said second coupling reactance to the secondary winding of said second transformer to provide a broader band-width coupling circuit between the input circuit and the output circuit.

2. The combination as defined by claim 1 in which the transformer windings are tuned to resonate in the band of signal frequencies to be passed.

3. The combination as defined by claim 1 in which the pair of connections include reactive elements connecting the coupling reactance and each of the connected windings.

4. The combination as defined by claim 3 in which the reactive elements are essentially capacitive.

5. The combination as defined by claim 1 in which the first coupling reactance is essentially an inductance and the second coupling reactance is essentially a capacitance.

6. The combination as defined by claim 1 in which the first coupling reactance is essentially a capacitance.

7. The combination as defined by claim 1 in which the second coupling reactance is a capacitance and the selector elements include switch means for connecting the secondary winding of the second transformer to an auxiliary non-coupling capacitance approximately equal to the second coupling capacitance for completing the circuit of this secondary winding when it is disconnected from the second coupling capacitance.

8. The combination as defined by claim 1 in which the broader bandwidth coupling circuit includes a resistance connected to improve the equalization of the response over the broader bandwidth.

9. In a variable bandpass coupling network including an input circuit and an output circuit for transferring a selectable band width of high frequency electric signals from the input circuit to the output circuit: a first transformer and a second transformer; said transformers being reactively coupled in cascade, each of said transformers having a primary winding and a secondary winding; capacitive elements connected to separately tune the individual windings to provide a narrow bandwidth cascade coupling between the input circuit and the output circuit; and selector elements connected for selectably connecting in common to both the primary winding of the first transformer and the secondary winding of the second transformer, a portion of the capacitive elements tuning one of the last-mentioned windings for providing a broader bandwidth coupling between them.

KENNETH WILLIAM HORNER.

REFERENCES CITED

The following references are of record in the file of this patent:

UNITED STATES PATENTS

| Number | Name | Date |
|---|---|---|
| 1,867,746 | Jacobs | July 19, 1932 |
| 2,262,707 | Farrington | Nov. 11, 1941 |
| 2,272,075 | Vreeland | Feb. 3, 1942 |
| 2,320,996 | Alexanderson et al. | June 8, 1943 |

FOREIGN PATENTS

| Number | Country | Date |
|---|---|---|
| 385,858 | Great Britain | Jan. 5, 1933 |